United States Patent [19]

Haugestad

[11] Patent Number: 4,726,619
[45] Date of Patent: Feb. 23, 1988

[54] SPLIT UNIVERSAL SUN VISOR FOR A VEHICLE WINDSHIELD

[76] Inventor: Oyvind Haugestad, 67746 Klinger Lake Rd., Sturgis, Mich. 49091

[21] Appl. No.: 24,221

[22] Filed: Mar. 10, 1987

[51] Int. Cl.⁴ .............................................. B60J 3/00
[52] U.S. Cl. ............................... 296/95 R; 296/97 A; 296/1 S; D12/191
[58] Field of Search ................ 296/95 R, 95 Q, 97 R, 296/97 A; D12/191

[56] References Cited

U.S. PATENT DOCUMENTS

| | | | |
|---|---|---|---|
| D. 239,705 | 12/1974 | Lund | D12/191 |
| D. 273,672 | 11/1981 | Lund | D12/191 |
| 2,628,124 | 2/1953 | Dieterich | 296/95 R |
| 2,653,050 | 9/1953 | Ashcroft | 296/95 R |
| 2,673,117 | 3/1954 | Krusemark | 296/95 R |
| 2,681,700 | 6/1954 | Krusemark | 296/95 R |
| 3,214,216 | 10/1965 | Brown, Jr. | 296/95 R |

*Primary Examiner*—Robert R. Song
*Attorney, Agent, or Firm*—Flynn, Thiel, Boutell & Tanis

[57] ABSTRACT

A split universal sun visor for shading the windshield of roofed automotive vehicles of different widths. An awninglike portion extends from the front edge of the vehicle roof forward in cantilevered relation above the vehicle windshield to shade the latter. The rear laterally outer portions of the sun visor mount to the roof of the vehicle adjacent the top corners of the windshield. The sun visor is adaptable to fit vehicles of different widths. Separate and laterally spaced right and left sun visor halves together define the awninglike portion and laterally outer portions. The visor halves have tabs extending toward but laterally spaced from each other. The tabs are located rearward from the top of the windshield of the vehicle. A connector plate is of width determined by the width of the vehicle and sufficient to extend between and overlap at its lateral ends the laterally spaced tabs of the visor halves. The connector plate is fixed to the tabs. The awninglike portions define therebetween a forward opening notch over the central portion of the windshield, the connector plate closing the rear end of the notch and said notch being defined between the opposed inner sides of the right and left visor halves.

13 Claims, 7 Drawing Figures

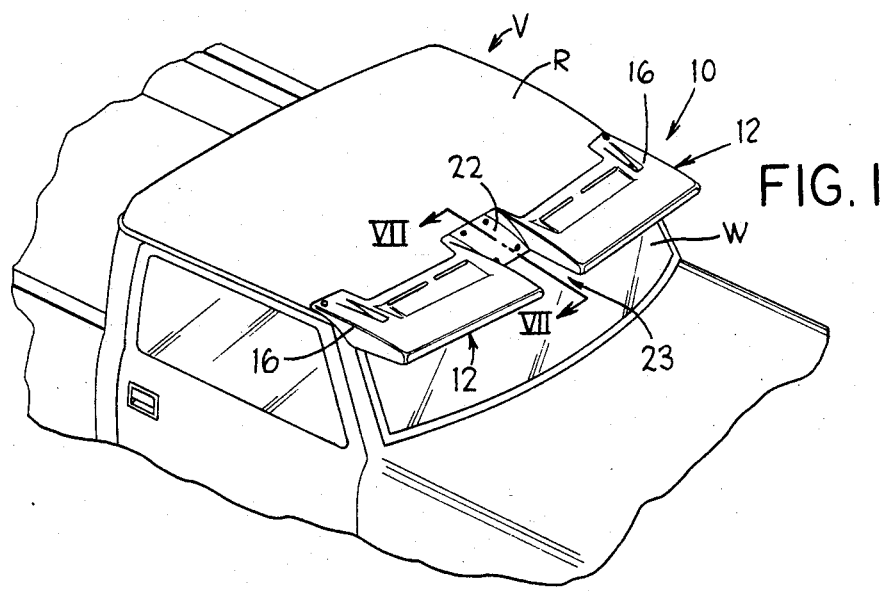
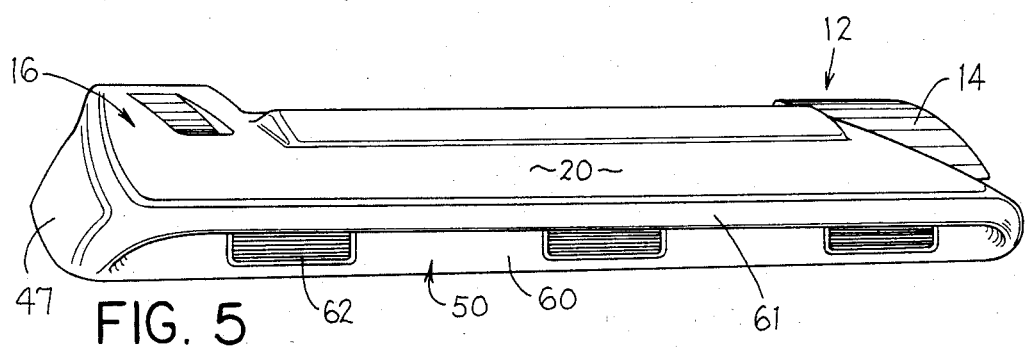
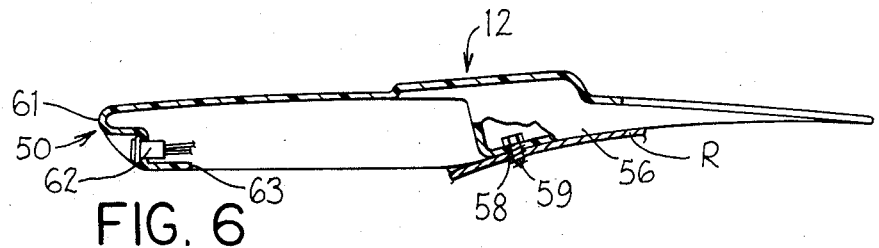
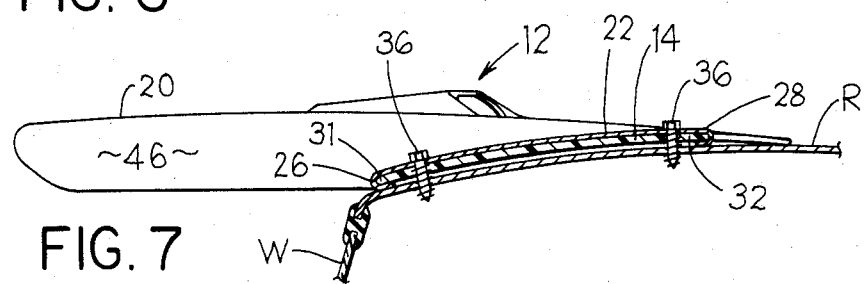

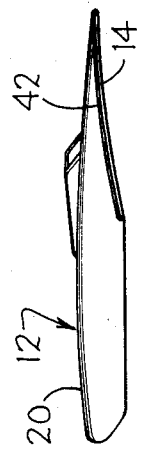
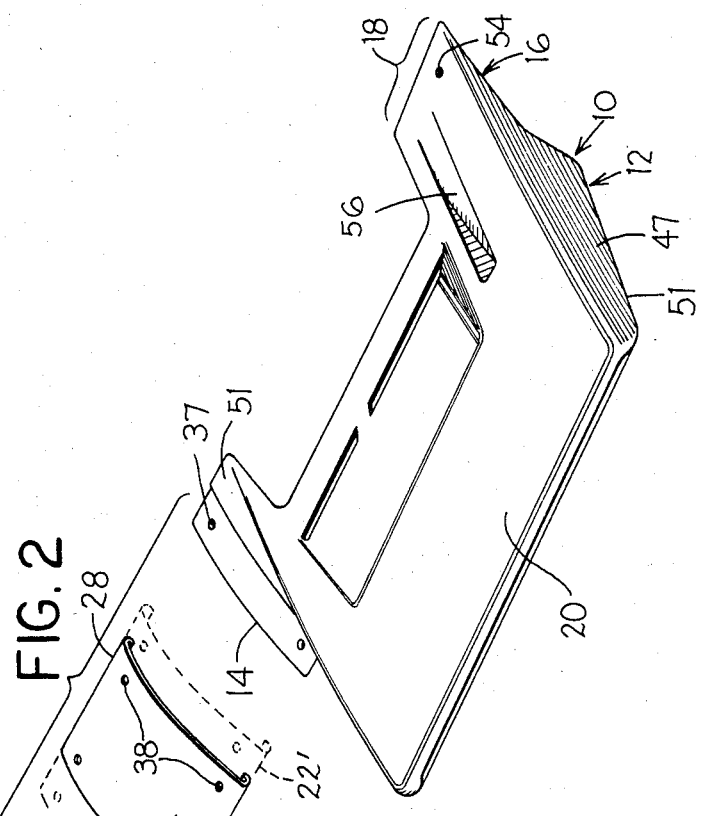
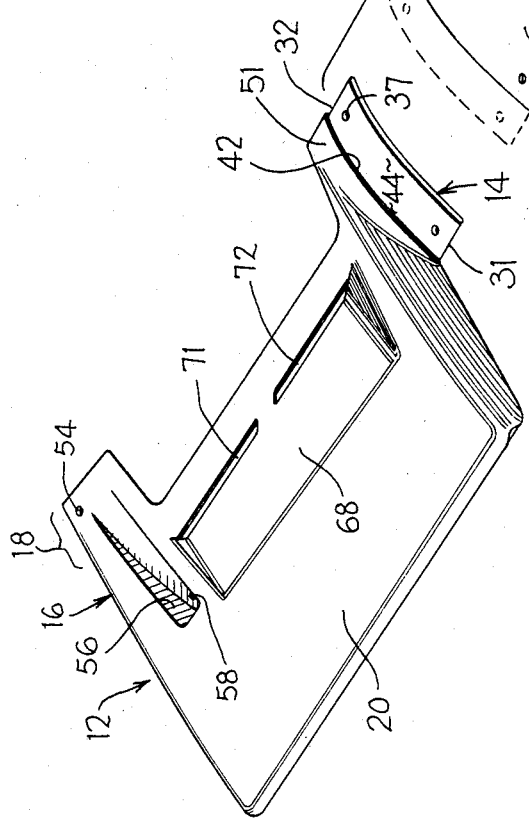
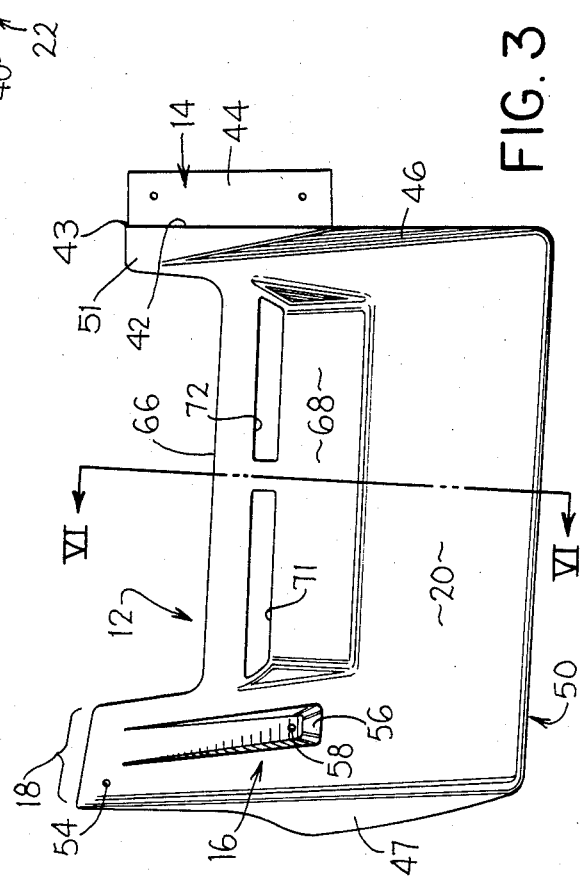

SPLIT UNIVERSAL SUN VISOR FOR A VEHICLE WINDSHIELD

FIELD OF THE INVENTION

This invention relates to a sun visor for external mounting on a vehicle to shade the windshield thereof.

BACKGROUND OF THE INVENTION

Detachable sun visors for shading the windshield of a vehicle, of a kind for mounting on the front portion of the vehicle roof and projecting forward in a cantilevered manner over the windshield, have long been known. Examples include those shown in U.S. Des. Pat. No. 159,144 (Dieterich), U.S. Des. Pat. No. 157,555 (Abrams), U.S. Des. Pat. No. 155,434 (Maher), U.S. Pat. No. 2,777,732 (Walsh), U.S. Des. Pat. No. 239,705 (Lund) and U.S. Des. Pat. No. 273,672 (Lund).

A difficulty encountered with prior sun visors is that a given one will normally fit vehicles of only a single width or narrow range of widths due to lack of ability to significantly expand or contract the effective width of a given sun visor. However vehicles, such as pickup trucks and vans, are available in a large range of widths, ranging from so called "full size" vehicles down to so called "compact", "sub-compact", and "mini" vehicles. The width difference of the top of the windshield of these vehicles may be as much as a foot or more. Thus to provide conventional sun visors fitting a majority of available vehicles typically requires stocking sun visors of a number of different widths, leading to undesirably large inventories, with resulting large space requirements and costs.

Moreover, conventional sun visors are typically bulky and hence expensive to ship.

Accordingly, the objects and purposes of the present invention include provision of a split universal sun visor for shading the windshield of roofed automotive vehicles of different widths, wherein a given sun visor is adaptable to fit a wide range of widths of vehicles by substitution of a small central piece of selectable width, wherein inventory size and cost is minimized, wherein shipping cost and package size are minimized, and wherein the inventive sun visor is readily installable on a vehicle easily, with ordinary hand tools, by unskilled persons with minimal instruction.

Other objects and purposes of the invention will be apparent to persons acquainted with apparatus of this general type on inspecting the accompanying drawings and reading the following description.

SUMMARY OF THE INVENTION

The objects and purposes of the invention are met by providing a split universal sun visor for shading the windshield of roofed automotive vehicles of different widths, comprises an awninglike portion for extending from the front edge of the vehicle roof forward in cantilevered relation above the vehicle windshield to shade the latter, means for mounting the rear laterally outer portions of the sun visor to the roof of the vehicle adjacent the top corners of the windshield, and means adapting the sun visor to fit vehicles of different widths. The latter means comprise (a) separate and laterally spaced right and left sun visor halves together defining said awninglike portion and means for mounting, wherein said visor halves have tabs extending toward but laterally spaced from each other, said tabs being located rearward from the top of the windshield of the vehicle, (b) a connector plate of width determined by the width of the vehicle and sufficient to extend between and overlap at its lateral ends the laterally spaced tabs of said visor halves, and (c) means for fixing said connector plate to said tabs said awninglike portions defining therebetween a forward opening notch over the central portion of the windshield, said connector plate closing the rear end of said notch, said notch being defined between the opposed inner sides of said right and left visor halves.

BRIEF DESCRIPTION OF THE DRAWINGS

FIG. 1 is a pictorial view of a sun visor embodying the invention mounted on a vehicle, here for example pickup truck.

FIG. 2 is an exploded enlarged pictorial view of the inventive sun visor of FIG. 1.

FIG. 3 is an enlarged top view of the left visor half of FIG. 2.

FIG. 4 is a right side (inner side) elevational view of the visor half of FIG. 3.

FIG. 5 is an enlarged pictorial view of the visor half of FIG. 3 taken generally from the front thereof and modified to mount electric lights along the front edge portion thereof.

FIG. 6 is an enlarged sectional view substantially taken on line VI—VI of FIG. 3.

FIG. 7 is an enlarged sectional view substantially taken on line VII—VII of FIG. 1.

DETAILED DESCRIPTION

FIG. 1 discloses a sun visor 10 embodying the invention and installed on the forward portion of the roof R of a vehicle V to shade the windshield W thereof. In the embodiment shown, by way of example only the vehicle is a pickup truck but the invention is utilizeable with a variety of vehicles.

The visor 10 embodying the invention comprises mirror imaged right and left visor halves 12. The visor halves 12 have opposed, closely but adjustably spaced, laterally inner ends defining inner mounting tabs 14 (FIGS. 2-5 and 7). The inner mounting tabs 14 are sheet-like and conform generally to the shape of the front central portion of the vehicle roof R adjacent the center of the windshield W.

The visor halves 12 have respective laterally outer ends 16 spaced remote from each other. The laterally outer ends 16 incorporate outer mounting portions 18 conforming generally to the shape of the front corner portions of the vehicle roof R adjacent the upper corners of the windshield W. The tabs 14 and outer mounting portions 18 are gently curved and concave downward to conform generally to the shape of the underlying roof portion of the vehicle.

Each visor half 12 has its major surface area formed as an awninglike portion 20 projecting forward in cantilevered relation from its inner mounting tab 14 and outer mounting portion 18, so as to cantilever forward beyond the top edge of the vehicle windshield W as seen in FIG. 7 and shade the major area of the windshield W of FIG. 1. The awninglike portions 20 are laterally spaced from each other by a distance greater than the separation of the corresponding inner mounting tabs 14, in normal mounting of the sun visor 10 on the vehicle. The laterally spaced awninglike portions 20 form therebetween a forward opening notch 23 (FIG.

1) over the central portion of the windshield W. The rear edge of the notch 23 is at the front edges of the inner mounting tabs and is effectively defined by a central connector plate 22 (FIGS. 1, 2 and 7). The central connector plate 22 is of lateral width to span the space between the tabs 14 and has right and left ends overlapping and releasably fixed to the opposed tabs 14, so as to connect together the laterally spaced right and left visor halves 12 as seen in FIG. 1.

In the preferred embodiment shown, the visor halves 12 are of conventional molded rigid plastics material. One unit was constructed of fiberglass (glass fiber and synthetic resin) but a variety of other materials are possible, for example molded ABS plastics material. The visor halves 12 are thus generally sheetlike in character with portions bent out of plane to adapt generally to typical vehicle top contours, for rigidity, and to provide structural features hereafter discussed.

Turning more specifically to the interconnection of the visor halves 12 by the central connector plate 22, the central connector plate 22 is gradually curved and conforms to the curvature of the tabs 14 and thus generally to the typical vehicle roof R front portion. The central connector plate 22 is rectangular as seen from the top. In the sun visor 10 as installed on a vehicle V, the connector plate 22 overlies the tabs 14. The front and rear edges 26 and 28 (FIGS. 2 and 7) of the connector plate are folded under to create opposed U-cross section channels in which are received the front and rear edges 31 and 32 of the tabs 14. This prevents vertical and fore-aft shifting of the tabs 14 with respect to the connector plate 22. The tabs 14 are received sidewardly into and beneath the connector plate 22.

The connector plate 22 is secured to the tabs 14 also by suitable fasteners 36 (FIG. 7) to establish the desired width of notch 23 between the visor halves 12. In the embodiment shown, pairs of holes 37 in the tabs 14 align with corresponding pairs of holes 38 through the central connecting plate 22 adjacent the left and right edges of the latter. By substituting different central connecting plates 22 of differing width one can select the lateral spacing between the visor halves 12, hence the lateral spacing of the outer mounting portions thereof, and hence the width of the vehicle that the sun visor will fit. FIG. 2 shows, in solid lines at 22 and broken lines at 22', two examples of central connector plate width, other widths being contemplated.

To provide a smooth and professional appearing installation, the top surface 40 and rear edge 28 of the central connector plate 22 are flush with the corresponding surfaces of the visor halves 12. This is accomplished by providing steps 42 and 43 (FIGS. 2 and 3) at which the top surface 44 and rear edge 32 of each tab 14 joins the corresponding awninglike portion 20.

The awninglike portion 20 of each visor half 12 is approximately rectangular in plan (as in FIG. 3) and extends approximately horizontally. However, in the preferred embodiment shown at FIG. 6, the top of the awninglike portion 20 is of slightly upward convex profile for better air flow therealong and onto the vehicle roof R, for appearance, and to enhance rigidity. The awninglike portion 20 has depending laterally inner and outer side skirts 46 and 47 joined at their front ends by a depending front skirt (FIGS. 5 and 6).

The rear of the inner side skirt 46 terminates at a shoulder 51 joined by the steps 42 and 43 to the tab 44 and substantially flush with the top surface 40 of the central connecting plate 22.

The outer side skirt 47 slopes gradually downward and rearward at its bottom edge 51 to about the foreaft center of the visor half 12, namely to about the normal location of the windshield post of the vehicle. The outer side skirt then slopes upward sharply and more gradually to the rear, to narrow to substantially zero vertical depth at the rear edge of the visor half 12. A mounting screw hole 54 is provided through the visor half 12 adjacent its outer rear corner.

A depression 56 starts near the rear outer corner of each visor half 12 near the outer side skirt 47, and slopes forward and downward. The forward end of the depression 56 is slightly rearwardly offset from the front edge of the corresponding tab 14. The bottom of the depression 56 is preferably slightly concave downward as generally indicated in dotted lines in FIG. 6. A further mounting screw hole 58 is provided in the bottom of the depression 56 adjacent the front end thereof. The bottom of the depression 56 conforms generally to the shape of the front portion of a typical vehicle roof R near the outer corner of the windshield W, so that the visor half 12 sits upon the roof R with the underside of the bottom of the depression 56 and the underface of the tab 14 (or more specifically the bent-under front edge 26 and rear edge 28 of the central connector plate 22).

The sun visor 10 is affixed to the roof of the vehicle V by any convenient means, preferably sheet metal screws 59 extending downward through the holes 54 and 58 into the vehicle roof R adjacent the outer edges thereof, just aft of the rear corner of the windshield. In addition, it is preferred that the fasteners 36 penetrating the holes 37 and 38 in the tabs 14 and central connector plate 38 be screws 36 which extend further and thread into corresponding holes not shown in the vehicle roof R immediately behind the central portion of the windshield W thereof, as indicated in FIG. 7. In this manner, the sun visor 10 is rigidly mounted to the vehicle roof at the center and both outer edges thereof.

It is contemplated however that the sun visor 10 may be mounted to the vehicle roof R only at the outboard edges thereof, namely by use of screws 59 through the mounting holes 54 and 58, and that the mounting holes 37 and 38 may merely be used for fixing the central connector plate to the tabs 14 (as by sheet metal screws, bolts or pop rivets or any other desired fastener). Such joinder is less rigid but requires fewer holes in the vehicle roof.

The front skirt 50 has a front facing lower portion 60 (FIGS. 5 and 6) which is rearwardly offset behind the front edge 61 of the awninglike portion 20 so that the front edge 61 forms a forward overhanging eyebrow. The front facing lower portion 60 may optionally have mounted in through-openings therein, conventional lamp units 62 actuable from the driver's compartment of the vehicle in a conventional manner. For increased rigidity of the front edge 62, the front facing lower portion 60 has a flange 63 extending a short distance rearward from the bottom edge thereof.

To permit air flow from in front of the windshield to flow more easily over the roof R of the vehicle, a rear opening notch 66 (FIGS. 2 and 3) is provided in the rear edge of the visor half 12 and extends a major portion of the width thereof, between the shoulder 51 and outer mounting portion 18.

To enhance appearance, rigidity and air flow, a central portion of the awninglike portion 20 is upset to form a rearward and upsloping ramp 68 interposed laterally between the front edges of the depression 56 and tab 14 and defining rear opening ports 71 and 72, through which air can flow from in front of the windshield over the top thereof to merge with the airstream through the notch 66 and flow rearward over the roof R of the vehicle. The notch 66 and ports 71 and 72 reduce air drag resulting from application of a visor to the vehicle and reduce air pressure stresses on the sun visor 10 during high speed travel of the vehicle.

OPERATION

While the operation of the apparatus will be apparent from the above description of the structure shown in the drawings, same will be briefly summarized for convenience.

Given the brand and model of vehicle to be equipped with a sun visor, and hence knowledge of the width of the front edge portion of the roof R thereof, the appropriate width central connector plate 22 can be selected from inventory. The left and right visor halves of 12 are urged laterally toward each other from their FIG. 2 position to insert the tabs 14 thereof laterally into the U-shaped channels at the front and rear edges 26 and 28 of the connector plate 22 until the holes 37 in the tabs 14 align with the holes 38 in the connector plate 22. The sun visor 10 is then applied to the front edge portion of the vehicle roof R with sheet metal screws 59 or other suitable fasteners entering the holes 54 and 58 in the outer mounting portions 18 and being threaded into corresponding undersized holes (not shown) previously drilled in the front corner portions of the vehicle roof R. Similarly, suitable fasteners 36 are run through the holes 37 and 38 in the tabs 14 and central connector plate 22 to prevent lateral shifting or forward bending of the center portion of the sun visor 10. Preferably, such fasteners 36 are the screws 36 shown in FIG. 7 which penetrate through the central connector plate 22 and tabs 14 and threadedly engage undersized holes (not shown) in the roof R of the vehicle to rigidly hold the center portion of the sun visor together and to the vehicle roof.

If desired, the sun visor 10 is removable from the roof of one vehicle and placeable on the roof of another. Similarly, if a portion of the sun visor 10, such as a visor half 12, becomes accidentally damaged in use, it can readily be removed from the vehicle and replaced without replacement of the remainder of the visor 10.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A split universal sun visor for shading a windshield of roofed automotive vehicles of different widths, comprising:

mirror imaged right and left visor halves, said visor halves having opposed, closely but adjustably spaced, laterally inner ends defining inner mounting tabs, said inner mounting tabs being sheetlike and conforming generally to the shape of the front central portion of a vehicle roof adjacent the center of the vehicle windshield, said visor halves having respective laterally outer ends spaced remote from each other and incorporating other mounting portions conforming generally to the shape of the front corner portions of the vehicle roof adjacent the upper corners of the windshield, each visor half having its major surface area formed as an awning-like portion projecting forward in cantilevered relation from its inner mounting tab and outer mounting portion, so as to cantilever forward beyond the top edge of said windshield and shade the major areas of the windshield, said awning-like portions being laterally spaced from each other by more than the width of the inner mounting tabs and forming therebetween a forward opening notch over the central portion of the windshield, said notch having a rear edge at the front edges of said inner mounting tabs;

means for adapting said sun visor to fit vehicles of different widths, comprising alternate central connecting plates of alternate lateral width, a said central connector plate having a lateral width to span the space between said tabs and having right and left ends overlapping and releasably fixed to said tabs, so as to connect together said laterally spaced right and left visor halves.

2. The apparatus of claim 1 in which said visor halves are of molded rigid plastics material, being sheet-like with portions bent out of plane for enhanced rigidity.

3. The apparatus of claim 1 in which said central connector plate has bent under front and rear flanges underlying front and rear portions of said tabs, said central connector plate being receivable sidewardly over said tabs, and including spaced fasteners for penetrating said tabs and central connector plate for securing same rigidly together.

4. The apparatus of claim 3 in which said fasteners extend through said central connector plate, tabs and vehicle roof to fixedly secure the central portion of said sun visor to said vehicle roof.

5. The apparatus of claim 1 including inner side skirts depending from the inner edge of said awninglike portion of said visor halves to join same to the corresponding tabs.

6. The apparatus of claim 1 including outer side skirts depending from the awninglike portion of each visor.

7. The apparatus of claim 1 including a front skirt depending from said awninglike portion of each visor half, said front skirt having a front facing lower portion rearwardly offset behind the front edge of said awninglike portion to form an eyebrow cantilevered forward over said front facing lower portion.

8. The apparatus of claim 7 including front facing electric lamps mounted on said front facing lower portion.

9. The apparatus of claim 1 including means defining a rear opening notch in the rear edge of said awninglike portion of each visor half, between said inner mounting tabs and laterally outer ends, for airflow therethrough from in front of the windshield over the top of the vehicle.

10. The apparatus of claim 1 in which said awninglike portion of each visor half has a rearwardly and upwardly sloped, generally central, ramp portion with a rear opening port for airflow therethrough from in front of the windshield over the top of the vehicle.

11. The apparatus of claim 10 in which said ramp is located adjacent and to the rear of the top of the windshield.

12. The apparatus of claim 1 in which outer mounting portions each include a forwardly and downwardly sloping depression and means for fixing the front portion of the bottom wall of said depression to the vehicle roof adjacent the front corner thereof.

13. A split universal sun visor for shading the windshield of roofed automotive vehicles of different widths, comprising:

an awninglike portion extending from the front edge of the vehicle roof forward in cantilevered relation above the vehicle windshield to shade the latter;

means for mounting the rear laterally outer portions of the sun visor to the roof of the vehicle adjacent the top corners of the windshield;

means adapting the sun visor to fit vehicles of different widths and comprising:

(a) separate and laterally spaced right and left sun visor halves together defining said awninglike portion and means for mounting, wherein said visor halves have tabs extending toward but laterally spaced from each other, said tabs being located rearward from the top of the windshield of the vehicle, (b) a connector plate of width determined by the width of the vehicle and sufficient to extend between and overlap at its lateral ends the laterally spaced tabs of said visor halves, and (c) means for fixing said connector plate to said tabs, said awninglike portions defining therebetween a forward opening notch over the central portion of the windshield, said connector plate closing the rear end of said notch, said notch being defined between the opposed inner sides of said right and left visor halves.

* * * * *